United States Patent
Patnala (10) Patent No.: US 8,401,827 B2
(45) Date of Patent: Mar. 19, 2013

(54) PROCESSING DEVICE AND METHOD FOR STRUCTURE DATA REPRESENTING A PHYSICAL STRUCTURE

(75) Inventor: Manoj Kumar Patnala, Warren, MI (US)

(73) Assignee: DAA Draexlmaier Automotive of America LLC, Madison Heights, MI (US)

(*) Notice: Subject to any disclaimer, the term of this patent is extended or adjusted under 35 U.S.C. 154(b) by 380 days.

(21) Appl. No.: 12/417,473

(22) Filed: Apr. 2, 2009

(65) Prior Publication Data

US 2009/0259329 A1 Oct. 15, 2009

Related U.S. Application Data

(60) Provisional application No. 61/124,085, filed on Apr. 14, 2008.

(51) Int. Cl.
*G06F 17/10* (2006.01)
(52) U.S. Cl. ....... 703/2; 703/1; 703/6; 700/98; 700/118; 700/182
(58) Field of Classification Search .................. 703/1, 2, 703/6; 700/98, 118, 182
See application file for complete search history.

(56) References Cited

U.S. PATENT DOCUMENTS

| | | | | |
|---|---|---|---|---|
| 2,171,405 A | * | 8/1939 | Sargent | 428/579 |
| 4,811,244 A | * | 3/1989 | Shimada et al. | 345/443 |
| 6,130,673 A | * | 10/2000 | Pulli et al. | 345/428 |
| 6,161,057 A | * | 12/2000 | Nakano | 700/197 |
| 6,169,549 B1 | * | 1/2001 | Burr | 345/419 |
| 6,324,469 B1 | * | 11/2001 | Okude et al. | 701/208 |
| 6,426,747 B1 | * | 7/2002 | Hoppe et al. | 345/419 |
| 6,618,694 B1 | * | 9/2003 | Shibuya et al. | 703/1 |
| 6,789,051 B1 | * | 9/2004 | Chen et al. | 703/2 |
| 6,813,749 B2 | * | 11/2004 | Rassaian | 703/7 |
| 6,816,820 B1 | * | 11/2004 | Friedl et al. | 703/2 |
| 6,904,395 B1 | * | 6/2005 | DeJack et al. | 703/7 |
| 6,947,879 B2 | * | 9/2005 | Yamada et al. | 703/2 |
| 7,280,948 B2 | | 10/2007 | Duggirala | |
| 7,289,635 B2 | * | 10/2007 | Naganarayana et al. | 381/71.4 |
| 7,467,074 B2 | * | 12/2008 | Faruque et al. | 703/8 |
| 7,499,845 B1 | * | 3/2009 | Quincy et al. | 703/7 |
| 7,512,527 B2 | * | 3/2009 | Nagase | 703/2 |
| 7,548,241 B2 | * | 6/2009 | Marshall et al. | 345/473 |
| 8,065,101 B2 | * | 11/2011 | Nishino et al. | 702/66 |
| 8,069,017 B2 | * | 11/2011 | Hallquist | 703/1 |
| 8,078,442 B2 | * | 12/2011 | Inoke et al. | 703/7 |
| 8,108,058 B2 | * | 1/2012 | Murrish et al. | 700/97 |
| 8,229,712 B2 | * | 7/2012 | Hirata | 703/1 |

(Continued)

FOREIGN PATENT DOCUMENTS

DE 102 22 700 B4 12/2003
WO WO 2005/033983 A2 4/2005

*Primary Examiner* — Saif Alhija
*Assistant Examiner* — Kibrom Gebresilassie
(74) *Attorney, Agent, or Firm* — Wolf, Greenfield & Sacks, P.C.

(57) ABSTRACT

A processing device and a method for processing structure data representing a physical structure are disclosed to obtain information about physical properties of the physical structure faster and with high quality and accuracy. The processing device for processing structure data representing a physical structure comprises an obtainer module for obtaining structure data representing a physical structure; a parts defining module for subdividing said structure data into at least two parts including a connection part and a material part; a meshing module for generating a mesh model approximating said physical structure by transforming said connection part and said material part into mesh elements having different sizes, wherein the mesh element sizes of said connection part are smaller than the mesh element sizes of said material part; and a processing module for processing said mesh model to estimate physical properties of said physical structure.

28 Claims, 8 Drawing Sheets

U.S. PATENT DOCUMENTS

| | | | |
|---|---|---|---|
| 2002/0014114 A1* | 2/2002 | Mancosu et al. | 73/146 |
| 2002/0042697 A1* | 4/2002 | Yamada et al. | 703/2 |
| 2002/0120430 A1* | 8/2002 | Yang et al. | 703/2 |
| 2002/0183993 A1* | 12/2002 | Hirata | 703/2 |
| 2003/0016832 A1* | 1/2003 | Naganarayana et al. | 381/71.4 |
| 2003/0048269 A1* | 3/2003 | Powell et al. | 345/420 |
| 2003/0149500 A1* | 8/2003 | Faruque et al. | 700/97 |
| 2004/0210429 A1* | 10/2004 | Yu et al. | 703/9 |
| 2004/0262365 A1* | 12/2004 | Kobayashi et al. | 228/103 |
| 2005/0107994 A1* | 5/2005 | Wan et al. | 703/2 |
| 2005/0114104 A1* | 5/2005 | Friedl et al. | 703/2 |
| 2005/0116949 A1* | 6/2005 | Hoppe | 345/423 |
| 2005/0116950 A1* | 6/2005 | Hoppe | 345/423 |
| 2005/0197822 A1* | 9/2005 | Onodera et al. | 703/22 |
| 2006/0031046 A1* | 2/2006 | Asper | 703/2 |
| 2007/0015601 A1* | 1/2007 | Tsunoda et al. | 473/346 |
| 2007/0073456 A1* | 3/2007 | Kabe et al. | 701/29 |
| 2007/0124720 A1* | 5/2007 | Aoki et al. | 716/20 |
| 2007/0204243 A1* | 8/2007 | Ito et al. | 716/4 |
| 2007/0247458 A1* | 10/2007 | Surazhsky | 345/423 |
| 2008/0015827 A1* | 1/2008 | Tryon et al. | 703/2 |
| 2008/0056506 A1* | 3/2008 | Naganarayana et al. | 381/71.4 |
| 2008/0079443 A1* | 4/2008 | Nishino et al. | 324/630 |
| 2008/0105598 A1* | 5/2008 | Fisher et al. | 209/402 |
| 2008/0127011 A1* | 5/2008 | Kobayashi et al. | 716/4 |
| 2009/0060347 A1* | 3/2009 | Kageura | 382/203 |
| 2009/0083007 A1* | 3/2009 | Wan et al. | 703/1 |
| 2009/0089019 A1* | 4/2009 | Dittmann et al. | 703/1 |
| 2009/0174711 A1* | 7/2009 | Lee et al. | 345/420 |
| 2009/0192766 A1* | 7/2009 | Rodriguez et al. | 703/1 |
| 2009/0312991 A1* | 12/2009 | Hirata | 703/2 |
| 2010/0094597 A1* | 4/2010 | Blain et al. | 703/1 |
| 2010/0145668 A1* | 6/2010 | Fisher et al. | 703/6 |
| 2010/0160072 A1* | 6/2010 | Matsunaga et al. | 473/324 |
| 2010/0168505 A1* | 7/2010 | Inman et al. | 600/30 |
| 2010/0235149 A1* | 9/2010 | Allen et al. | 703/2 |
| 2010/0266891 A1* | 10/2010 | Kwon et al. | 429/159 |
| 2010/0308163 A1* | 12/2010 | Goncalves De Oliveira | 244/117 R |
| 2010/0318327 A1* | 12/2010 | Holden et al. | 703/1 |
| 2011/0093219 A1* | 4/2011 | Parker et al. | 702/34 |
| 2012/0051911 A1* | 3/2012 | Baik et al. | 416/61 |
| 2012/0215498 A1* | 8/2012 | Hallquist et al. | 703/1 |

* cited by examiner

| Run Number | Invention | Prior Art | Diff | % Diff |
|---|---|---|---|---|
| MODE | CYCLES | CYCLES | | |
| 1 | 26.56 | 26.78 | 0.22 | 0.83% |
| 2 | 31.62 | 31.32 | -0.30 | -0.96% |
| 3 | 33.81 | 33.95 | 0.14 | 0.43% |
| 4 | 37.45 | 36.78 | -0.67 | -1.81% |
| 5 | 40.76 | 40.98 | 0.22 | 0.53% |

Fig. 7

PROCESSING DEVICE AND METHOD FOR STRUCTURE DATA REPRESENTING A PHYSICAL STRUCTURE

CROSS-REFERENCE TO RELATED APPLICATION

This application claims the benefit of U.S. Provisional Patent Application Ser. No. 61/124,085, filed Apr. 14, 2008, which is hereby incorporated herein by reference.

FIELD OF THE INVENTION

The present invention relates to a processing device and a processing method for processing structure data representing a physical structure.

BACKGROUND

Design and development of new products is a challenging task. In particular, time to market and quality requirements put a lot of pressure on the engineer to design and develop new products quickly without jeopardizing the quality. Thereby, it is very important to predict the physical properties of the final product. For example, the final product may be integrated in a larger structure which often requires the product to only have specific physical properties to meet the requirements of the end manufacturer. This is for example the case in the automotive industry, in which the automotive supplier has to supply products to a car manufacturer which meet certain standards.

Several ways are known for assisting in the design and development of new products. For example, it is possible to create miniature models made out of wood or plastics to estimate the physical properties and behavior of the end product. This process is usually cumbersome and expensive. Alternatively, computer simulations to give a realistic prediction of the behavior of the product under certain conditions are gaining more and more attention and are already used today in several disciplines in mechanical, electrical and photonic engineering.

For example, the design of an automotive interior plays a pivotal role in creating a high quality, functional and appealing car, wherein designing a safe and robust interior within the guidelines of regulation agencies and car manufacturers is a challenge. Conventionally Finite Element Analysis (FEA) tools are used to validate the design before it goes into production by computer simulation.

In the Finite Element Method (FEM) a physical structure is modelled by a set of appropriate finite elements interconnected with nodes. Elements may have physical properties such as thickness, coefficient of thermal expansion, density, Young's modulus, shear modulus and Poisson's ratio.

FEM is used for finding approximate solutions of partial differential equations as well as of integral equations such as the heat transport equation. The challenge is to create an equation that approximates the equation to be studied, but is numerically stable so that errors in input data do not lead to a meaningless output.

FEA assists in obtaining a realistic prediction of stiffness and strength and also minimizing weight and materials. It helps in identifying of where structures bend or twist and indicates the distribution of stresses, strain and displacement. Elements are bounded by nodes and define localized mass, stiffness and other properties. Therefore, the product behavior can be predicted in advance so that an accurate prototype can be built.

Although FEA tools speed up the design and development process tremendously in comparison to creating several real models made of wood, plastic, metal, etc. and analyzing their physical properties, there are several problems involved with FEA.

For example, the more realistic a model has to be, the more calculation and computer time is needed to obtain information about the physical properties and behavior of the product to be modelled. Additionally, in the automotive industry, for example, there are several aspects to be analyzed such as the static properties, dynamic properties and noise, vibration and harshness (NVH) behavior.

Conventionally different FEA programs, such as Nastran, Abaqus and LS-DYNA, are used for analyzing different aspects, which increases complexity, time, costs and manpower when a product model is to be analyzed. Further, usually CAD data representing a design is used as input and has to be modified and prepared to suit the FEA program. This is a complex task, since different programs require different input data and the quality of the simulation results is varying with the input data. Accordingly, as discussed above, the modification and preparation of a model for FEA usually has to take into account the kind of analysis, such as static, dynamic or NVH, so that conventionally several different models used together with different programs are needed.

For example, a first FEA program possesses a well established code for dynamic simulations. It has good material models, contact algorithms and multi CPU scalability, however, it is not well suited for NVH and static analysis. To do NVH and static simulations, the model has to be converted to a second or third program format.

SUMMARY OF THE INVENTION

Therefore, there is a need to provide a device and a method to obtain information about physical properties of a physical structure faster and with high quality and accuracy while reducing the complexity and number of models, calculations and programs needed.

This is achieved by the subject-matter of the independent claims of the present application. Advantageous embodiments are described in the dependent claims.

According to an embodiment, a processing device for structure data representing a physical structure comprises an obtainer module for obtaining structure data representing a physical structure, a parts defining module for subdividing said structure data into at least two parts including a connection part and a material part, and a meshing module for generating a mesh model approximating said physical structure by transforming said connection part and said material part into mesh elements having different sizes. The mesh element sizes of said connection part are smaller than the mesh element sizes of said material part. Further, the processing device comprises also a processing module for processing said mesh model to estimate physical properties of said physical structure. Accordingly, structure data may be pre-processed to take into account areas of interest, for example, for dynamic, static or NVH analysis, when generating the mesh model approximating the physical structure. Therefore, one mesh model may be used for different analysis types, since the analysis types are already considered in the mesh model, which makes data management and time management easier and leads to faster and better results.

According to an advantageous example, the meshing module is adapted to progressively increase the mesh element size from the center of the connection part. Accordingly, it is possible to define the areas of interest for the analysis in more detail.

According to another advantageous example, the material part comprises of at least one of a viscoelastic material part and an elastic plastic material part, said viscoelastic material part and said elastic plastic material part having different mesh element sizes. Accordingly, in the preparation of the mesh model not only a connection part and a material part can be defined, but also details of the material part, such as metal or plastic, can be taken into account to provide are more widely usable mesh model.

According to another advantageous example, the connection part includes at least one of a screw, a clip, a snap and a base part of a screw, a clip and a snap. Accordingly, different connection parts with different properties may be defined to provide a more detailed mesh model.

According to another advantageous example, the processing device comprises an identifier module for identifying at least one of said connection part and material part in said structure data and preferably the identifier module is adapted to identify at least one of a screw, a clip, a snap, a viscoelastic material part and an elastic plastic material part. Accordingly, the connection part or material part or other parts can be identified and the parts defining module may subdivide the structure data accordingly.

According to another advantageous example, the processing device further comprises a link defining module for defining nodes of mesh elements and for linking selected nodes of selected mesh elements to form at least one link representing a force. Accordingly, links can be defined selectively so that results may be obtained quicker and an erroneously increased stiffness of the assembly due to use of too many nodes can be avoided.

According to another advantageous example, the link defining module determines an area of overlap between the connection part and another part, wherein the area comprises touch points representing said nodes. Accordingly, the nodes and links to be selected can be determined by the overlap.

According to another advantageous example, the processing module is adapted to process the mesh model using a Finite-Element-Analysis-program for computer-aided numerical simulation of said physical structure. Accordingly, the processing module may be limited to one Finite-Element-Analysis-program to perform NVH, static and dynamic analysis with basically one mesh model.

According to another advantageous example, the Finite-Element-Analysis-program performs at least one of a surface contact algorithm and an edge contact algorithm and the mesh model takes into account at least one of fully integrated element formulation and a partially integrated element formulation. Accordingly, the physical properties and behavior may be estimated quickly and with high accuracy.

According to another advantageous example, the Finite-Element-Analysis-program is an explicit code based on energy balance. Accordingly, accurate results for the physical properties of the physical structure may be obtained.

According to another advantageous example, the processing device further comprises a production unit for producing the physical structure according to the structure data corresponding to the mesh model associated with the desired physical properties. Accordingly, the processing device may not only estimate physical properties of the physical structure but may also manufacture the physical structure, after the desired physical structure with the desired physical properties has been found.

According to another embodiment, a processing method for structure data representing a physical structure comprises obtaining structure data representing a physical structure, subdividing said structure data into at least two parts including a connection part and a material part, and generating a mesh model approximating said physical structure by transforming said connection part and said material part into mesh elements having different sizes. The mesh element sizes of said connection part are smaller than the mesh element sizes of said material part. Further, the method comprises processing said mesh model to estimate physical properties of said physical structure. Accordingly, structure data may be preprocessed to take into account areas of interest, for example for dynamic, static or NVH studies, when generating the mesh model approximating the physical structure. Therefore, one mesh model may be used for different analysis types, since the analysis types are already considered in the mesh model, which makes data management easier and leads to faster and better results.

According to another embodiment, a program may be provided including instructions adapted to cause data processing means to carry out a method with the above features.

According to another embodiment, a computer readable medium may be provided, in which a program is embodied, where the program is to make a computer execute the method with the above features.

According to another embodiment, a computer program product may be provided, comprising the computer readable medium.

Further advantageous features of the invention are disclosed in the claims.

DETAILED DESCRIPTION OF THE PREFERRED EMBODIMENTS

Preferred embodiments of the invention are described with reference to the figures. It is noted that the following description contains examples only and should not be construed as limiting the invention.

Embodiments of the invention generally relate to processing structure data, which is, e.g. CAD data, describing a physical structure to be appropriately modeled so that the physical properties of the physical structure may be estimated with high accuracy. Briefly said, a generated detailed mesh model approximating the physical structure and taking into account in advance its characteristic features and the type of physical properties to be estimated, may be used with different kinds of FEA programs or analysis types, such as dynamic, static and NVH providing information about the physical properties and behavior of the physical structure faster while maintaining the quality and accuracy of the results.

Figure 1:
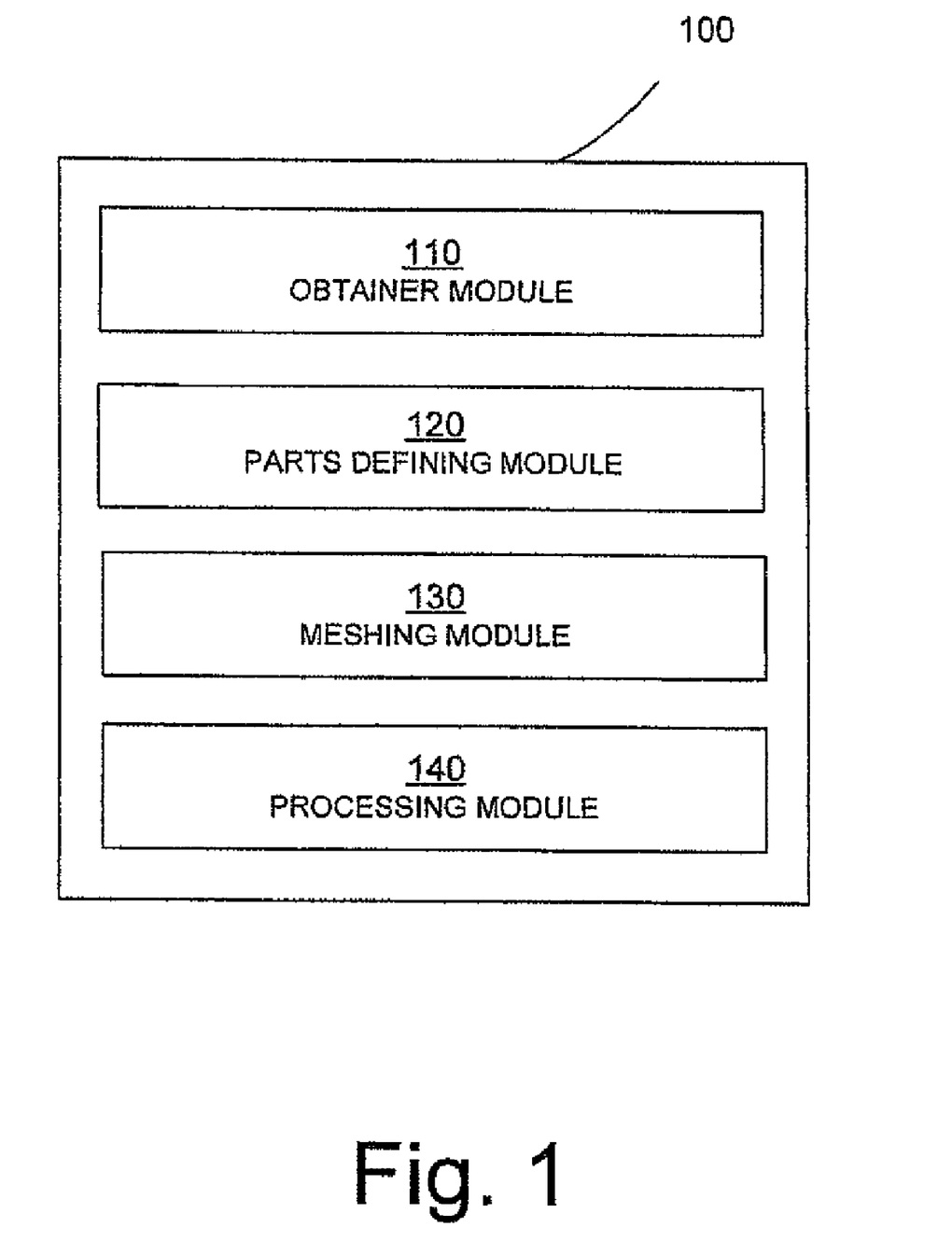
FIG. 1 illustrates modules of a processing device according to an embodiment of the invention.

FIG. 1 illustrates modules of the processing device 100 according to an embodiment of the invention, comprising an obtainer module 110, a parts defining module 120, a meshing module 130 and a processing module 140. A processing device within the meaning of the present application and the claims is any entity that receives data describing a physical structure, processes and analyzes the data according to the areas and physical properties of interest of the physical structure and may even produce, in a last step, a prototype of the physical structure according to structure data describing a physical structure that has desired physical properties.

The obtainer module 110, the parts defining module 120, the meshing module 130 and the processing module 140 are connected suitably, preferably internally, to transfer and process structure data. Further, the processing device 100 may comprise some kind of controller to control the operations of the modules. Alternatively, the functions of the modules, in particular the parts defining module 120, the meshing module 130 and the processing module 140, may be realized by a microprocessor, computer, field programmable gate array (FPGA) or integrated circuit, such as an application specific integrated circuit (ASIC) but are not limited thereto.

Therefore, it should be understood that the modules may not necessarily be physically different units, as shown in FIG. 1, but the modules 120, 130, 140 and obtainer module 110, which may be regarded as an input interface, may be integrated in a suitable form realized by software, hardware or a combination thereof to achieve their functions, which will be described below.

In detail, the obtainer module 110 obtains structure data representing a physical structure. It should be understood that as an obtainer module 110, any suitable unit may be used that collects or receives data or accesses a database in which data, such as structure data, is stored.

In more detail, the obtainer module 110 may be directly connected to a CAD program for developing a CAD model describing the physical structure. Therefore, for example, structure data may be CAD data of a CAD model developed in the design department of an automotive supplier or car manufacturer. Accordingly, the physical structure may be any automotive part, such as an automotive interior part including various types of consoles, e.g. front console, middle console, control console, etc., or automotive exterior part comprising a bumper, trunk deck, engine hood, etc.

The thus obtained structure data may then be provided to the parts defining module 120. The parts defining module 120 subdivides the structure data into at least two parts including a connection part and a material part. The connection part may be a part of the structure on which stress or strain is present when a load is applied to the structure.

For example, an automotive interior part comprises several connections, such as clips, screws and snaps and also several high stress areas, such as the interfaces of clips, screws and snaps with substrate, e.g. a base part of the connection made of viscoelastic material or elastic plastic material similar to the material part. Therefore, the connection part may be regarded as a part connecting two structures including its base and can be represented by different types of fasteners, welds, etc. Further, it should be understood that a connection part is not limited to a fixed tight connection but should also include two parts abutting each other or parts that frequently come under direct customer abuse, thus producing a connection through touching. Details will be described later with respect to FIG. 4B.

The material part may be a viscoelastic material part, an elastic plastic material part or a combination thereof and will be described in more detail later.

The meshing module 130 generates a mesh model approximating the physical structure by transforming the connection part and said material part into mesh elements having different sizes. The mesh element sizes of the connection part are smaller than the mesh element sizes of the material part, which is shown in and will be described in more detail later with respect to FIG. 4B.

In the context of FEA, mesh elements may be regarded as finite elements to be used with finite element code.

In an another embodiment, the material part may be subdivided in a viscoelastic material part and an elastic material part, such as plastic and metal, respectively, so that also the meshing criteria for these two different parts may be defined differently. Since the mesh model may be used for dynamic studies, the mesh element size should be in the acceptable range for metal, e.g. steel, however, sometimes small, for features that also must be captured, e.g. washer. Different mesh element sizes may thus be used for the viscoelastic material part and the elastic plastic material part. Therefore, for example, connection features can be captured based on static analysis requirements and other features or parts can be captured based on dynamic analysis requirements to keep the model size in an acceptable range.

Subsequently, the generated mesh model may then be processed. In detail, the processing module 140 processes the mesh model to estimate physical properties of the physical structure. The physical properties may be associated with dynamic or static behavior of the physical structure or with noise, vibration or harshness (NVH) requirements.

The processing module 140 can process the mesh model using a Finite-Element-Analysis program for computer-aided numerical simulation of the physical structure. For example, the processing module may be realized as a function preformed by a CPU or multiple CPUs in a computer executing code of the Finite-Element-Analysis program, wherein the program may preferentially be an explicit code based on energy balance. This is especially advantageous for static and dynamic analysis and an implicit code may be advantageous for NVH analysis.

As described above, the modules of the processing device 100 may be realized by software, hardware or a combination thereof to achieve their functions, which will be described in more detail in the following.

Figure 2:
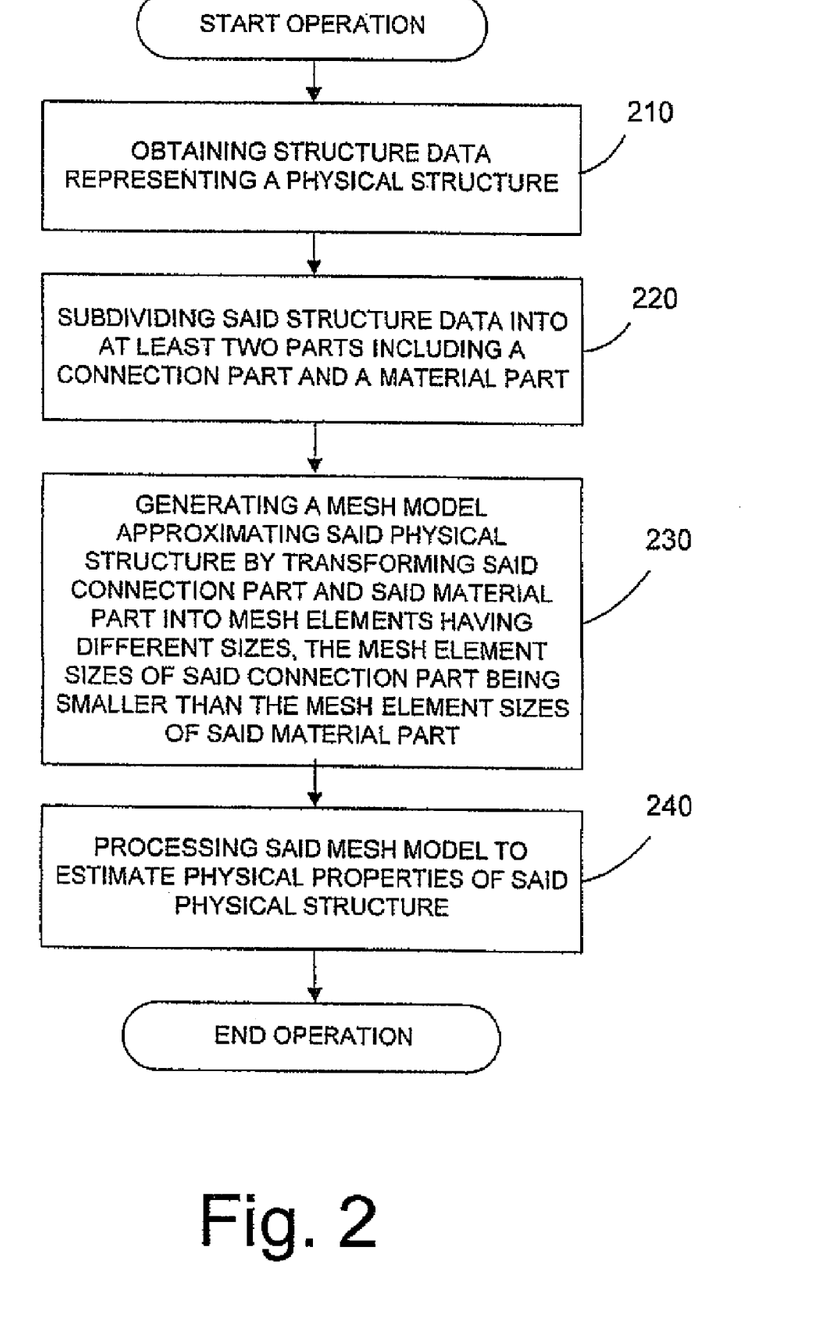
FIG. 2 illustrates operations of a method of processing structure data according to an embodiment of the invention.

Operations of the processing device 100 will be described with regard to FIG. 2. FIG. 2 illustrates a flow diagram of operations of a processing method for structure data representing the above described physical structure, such as during operation of the processing device 100 shown in FIG. 1.

In a first operation 210 structure data representing a physical structure is obtained. Structure data and the physical structure have been described in detail above, and it is referred to the above sections to avoid unnecessary repetition.

In a next operation 220, the structure data is subdivided into at least two parts including a connection part and a material part. As described above, there may be several different connection parts and material parts belonging to the same physical structure.

In operation 230, a mesh model approximating the physical structure by transforming the connection part and the material part into mesh elements having different sizes is generated. In general, the average mesh element sizes of the connection part are smaller than the sizes of the material part. Further, if the material part is further subdivided in a viscoelastic material part and an elastic plastic material part, the average size of elements is generally larger for metal than for plastics. A more detailed description of the meshing will be given below with respect to FIGS. 4A, 4B and 4C.

In operation 240, the mesh model is processed to estimate physical properties of the physical structure. Thereby, for example, a known Finite-Element-Analysis-program may be used.

In an advantageous embodiment, before the mesh model is processed, an assembly process may be carried out with respect to the mesh model. For example, nodes of elements may be defined on the mesh elements and selected nodes of selected elements may be linked to form a link, which represents a force between the selected elements. For example, as will be described below, a specific element formulation may be assigned to the mesh elements describing how a mesh element should behave when the mesh model is processed.

Figure 3:
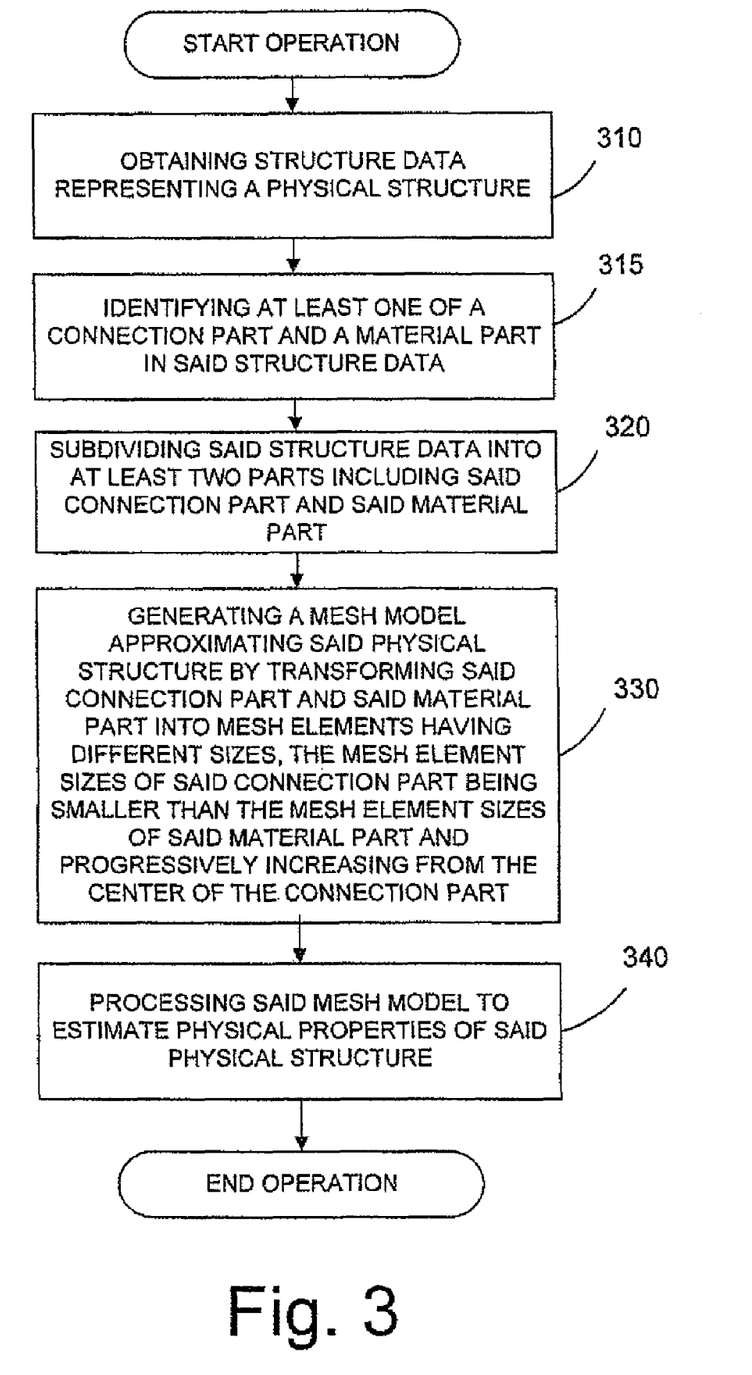
FIG. 3 illustrates operation of a modification of the method shown in FIG. 2.

Next, a modification of the method described with respect to FIG. 2 is illustrated in FIG. 3.

In the flow diagram of FIG. 3, operation 310 basically corresponds to the previously discussed operation 210.

Subsequently, in operation 315, once structure data is obtained, it is identified, whether one or several connection parts or one or several material parts are present in the structure data. This operation 315 may be realized in the processing device by an identifier module, not shown, to identify at least one of the connection part and the material part. The identifier module may also identify the type of connection part, namely a screw, a clip, a snap, a base part of a screw, a base part of a clip, a base part of a snap, a combination thereof, or some other fastener or other connection. Further, once a material part is identified, it may also be identified whether the material part is a viscoelastic material part or an elastic plastic material part so that different mesh element sizes may be defined for different parts. It should be noted that also the base parts of a screw, a clip, or a snap may be made of a viscoelastic material or an elastic plastic material.

In the next operation, operation 320, the structure data is then subdivided into the above mentioned parts according to the identification.

Following the subdivision of the parts, a mesh model may now be generated, which approximates the physical structure, in operation 330. Thereby, the connection part and the material parts, and preferably also their subdivisions, are transformed into mesh elements having different sizes. As shown in the example of FIG. 4B, the mesh element sizes of the connection part are smaller than the mesh element sizes of the material part and the mesh element size of the connection part, in this example especially of the base part, are progressively increasing from the center of the connection part to its outer surroundings.

Following the generation of the mesh model, the mesh model is processed, for example by using a Finite-Element-Analysis program for computer-aided numerical simulation of the physical structure, to estimate the physical properties of the physical structure.

Figure 4A:
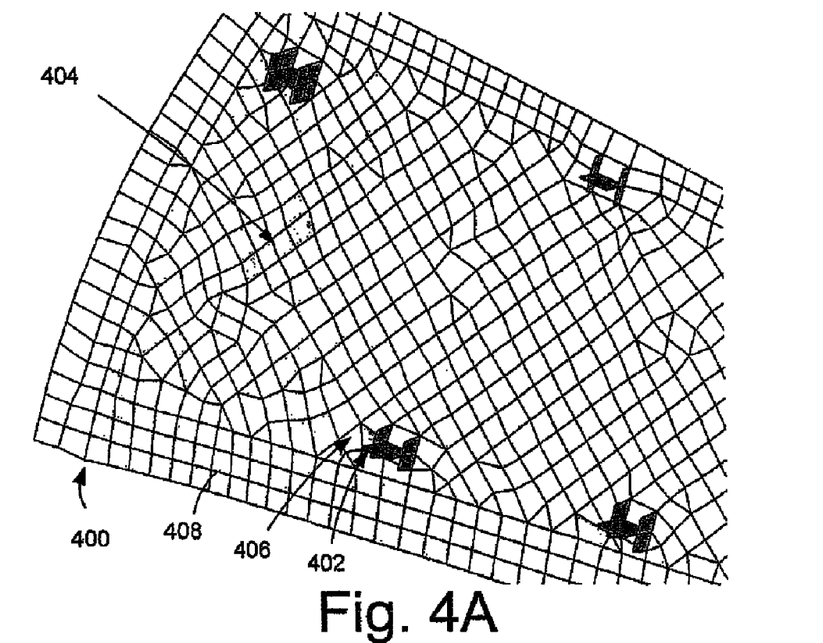
FIG. 4A is an illustration of a mesh model approximating a physical structure according to the prior art.

FIG. 4A is an illustration of a mesh model according to the prior art. FIG. 4A shows an automotive interior part 400 having a material part 404 and several connection parts illustrated as clips, wherein one clip is denoted with reference numeral 402. The surrounding area 406 around the clip 402 has basically the same mesh element size as the mesh element size of the material part 404. Furthermore, the mesh element sizes of the clip 402 itself are in the same size range as the mesh element sizes of the material part 404. A single mesh element of the material part is denoted for illustration with the reference numeral 408.

Figure 4B:
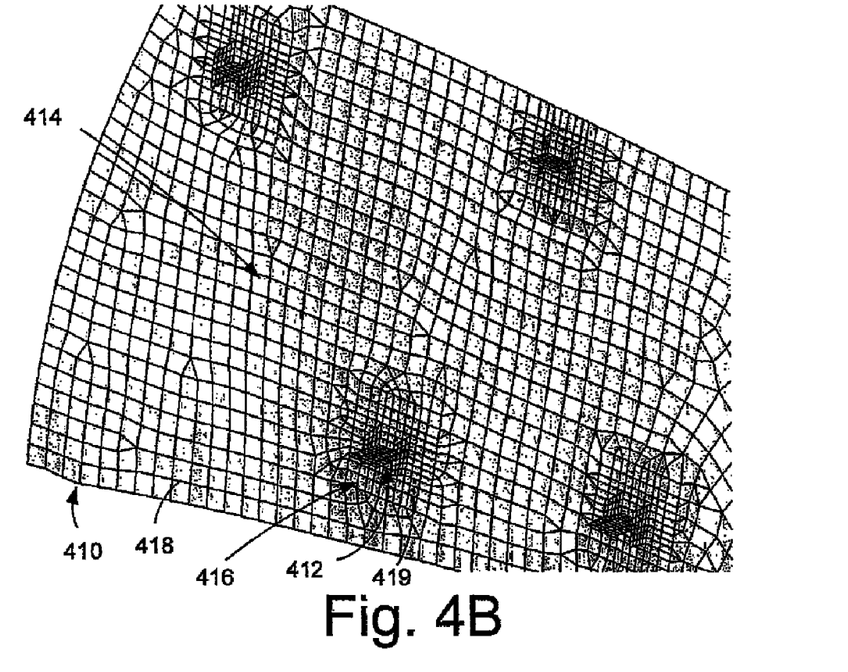
FIG. 4B is an illustration of a mesh model approximating a physical structure according to the present invention.

In contrast to FIG. 4A, FIG. 4B is an illustration of a mesh model approximating a physical structure according to the present invention.

Again, an automotive interior part is shown. Further, the automotive interior part 410 comprises a material part 414 and a connection part 412, 416. It is noted that, for example, the connection part may be defined as the actual connection, such as a clip 412 (or screw, snap, not shown), and a base part of the clip being a surrounding area 416 around the clip 412. For illustrative purposes a mesh element 418 of the material part 414 is shown as well as a mesh element 419 of the connection part, wherein the size difference is clearly visible. Note that there are also no triangular elements in the connection part, which will be described below.

Finally, it may be mentioned that the connection part may also be a connection, such as a clip, a screw, a snap, etc., or a base part or a combination thereof depending on the area of interest for the desired analysis. In general, if load is applied to a part of the physical structure, then there may be stress or strain in the connection part.

Next, meshing will be described in more detail and it will be referred to FIG. 4B when appropriate.

In the meshing process, material parts and connection parts are identified, as described above. Further, material parts may be separated into viscoelastic material parts and elastic plastic material parts, not shown.

On the other hand, the connection parts may also be identified and categorized as follows. First, as described above, the connection part may be defined as a connection 412 or a base part 416 or a combination thereof. Connections to be identified are, for example, clips, snaps and screws with or without washers.

A clip is usually a complex element comprising of a clip unit and a clip tower, wherein the clip tower is inserted in the clip unit, as known in the art. The mesh element size of the clip tower should be in the region of 2 to 4 mm and the width of the clip tower should comprise 3 to 5 rows of mesh elements, preferably 3 or 5 rows. Triangular elements at the sidewalls of the clip tower and the interface of the clip tower and substrate, e.g. the base part 416, should not be there.

It should be noted that the clip tower or, in the example of a screw, a screw boss, or a snap may be made of the same material as the material part, namely a viscoelastic material or an elastic plastic material.

Further, areas of interest are the interface of the connection 412 with the substrate, e.g. the base part 416, here also a small mesh element size is desired.

In the above identified areas of interest triangular elements may preferably be avoided and the mesh may follow a flow pattern. For example, the connection part comprising the area of interest is transformed in mesh elements, wherein the mesh element size may be increased progressively from the center of the connection part, as can be seen in FIG. 4B, and up to the third to fourth row around the connection, such as the clip, no triangular elements should be defined.

An example of a flow pattern is as follows. Row 1 may be an element of 2.0 mm, row 2 of 2.6 mm, row 3 of 3.4 mm, row 4 of 4.4 mm, row 5 of 5.7 mm and row 6 of 7.4 mm. The progressive increase of the mesh element size may be performed for four to eight rows and preferably six rows starting from the center of the connection part. The average mesh element size in the mesh model should be in the range from 7 to 12 mm. For elastic plastic materials the first row around connections should be 2 mm and the transition to the average element size of 6 mm to 10 mm should be done in 2 rows.

The above mentioned numbers are especially preferable for viscoelastic material parts and for elastic plastic material parts, the average element size may be smaller. It is noted that the base part on which the connection is placed, may comprise of the same material as the material part, namely elastic plastic material or viscoelastic material, for example. Further, it is noted that the detailed description of the mesh generation of and around a connection only refers to an advantageous example and should not be construed as limiting the invention.

In the following, an assembly process will be described with respect to FIG. 4C.

There are many different types of connections used for connecting automotive interior parts including clips and screws, for example. The connections are represented as links, such as nodal rigid body. However, especially for clip representation, existing techniques are inaccurate, since, for example, the female part of the clip has a larger opening to locate a part and to allow variations in mating parts. Using all nodes for the connection is thus inaccurate as it increases the stiffness of the assembly.

Therefore, in the assembly process, a link defining module may be used defining nodes of mesh elements and linking selected nodes of selected mesh elements for forming at least one link representing a force.

In detail, an area of overlap between the connection part and another part may be determined or calculated. This area comprises touch points representing the nodes.

For example, the touch area of a snap, the area where the snap connects to another part, may be calculated or measured. Similarly, the touch area or an area of overlap of a clip may be determined.

Figure 4C:
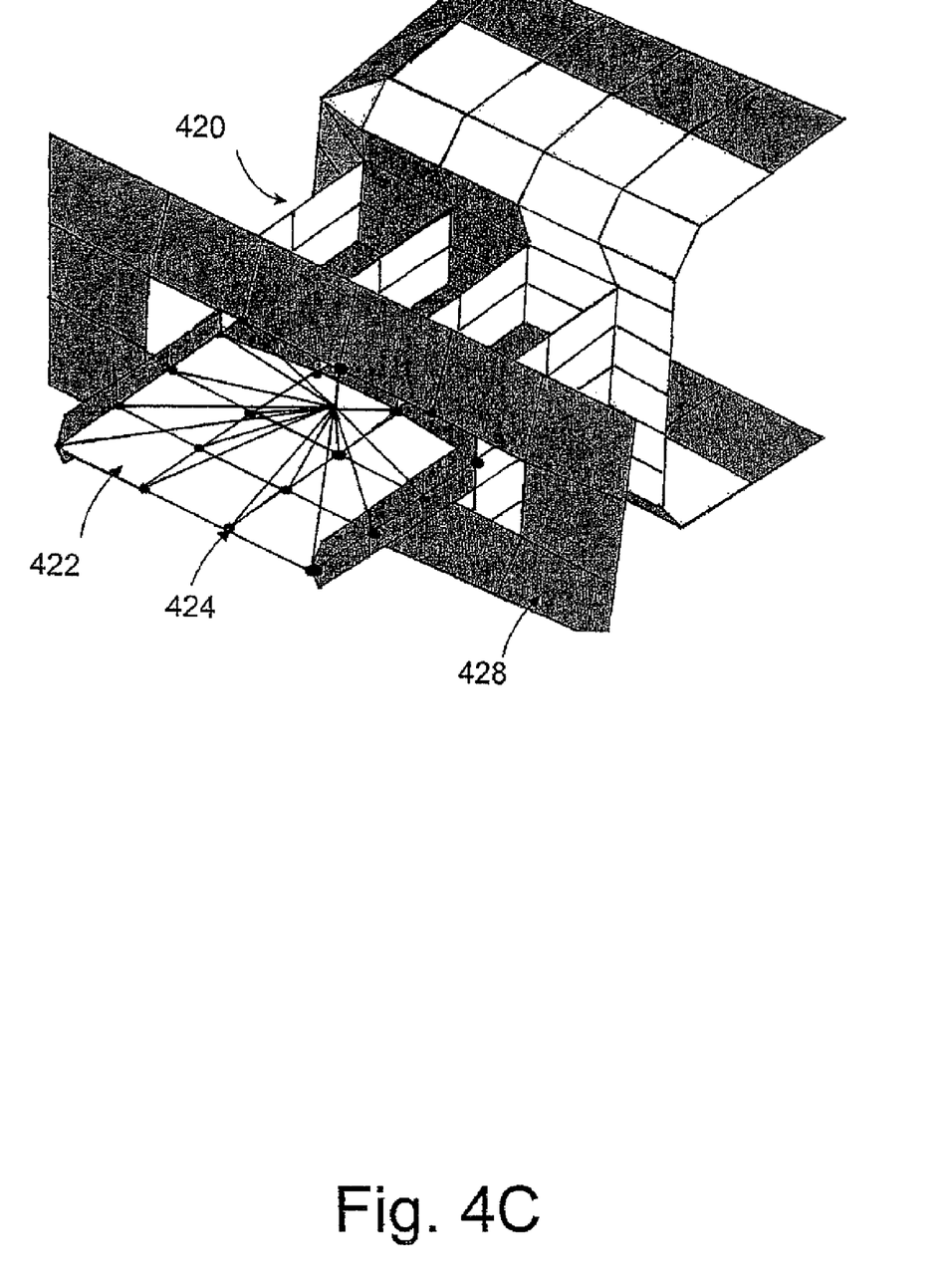
FIG. 4C is an illustration of an example of a mesh model of a clip showing elements and nodes.

This is for example shown in FIG. 4C. FIG. 4C shows how to connect a clip tower 420, and in particular the nodes (black dots) of the clip tower, for example node 424 to another part 428. In this example, the mesh element 422 of the clip tower 420 comprises four nodes in each corner of the mesh element. Further, the other part 428 comprises also nodes (black dots), which may selectively be connected to the nodes of the clip tower 420 using links, namely a link representing a force between connected mesh elements.

The same selection of using basically nodes of the area of overlap may be used also for screws and snaps.

Figure 5:
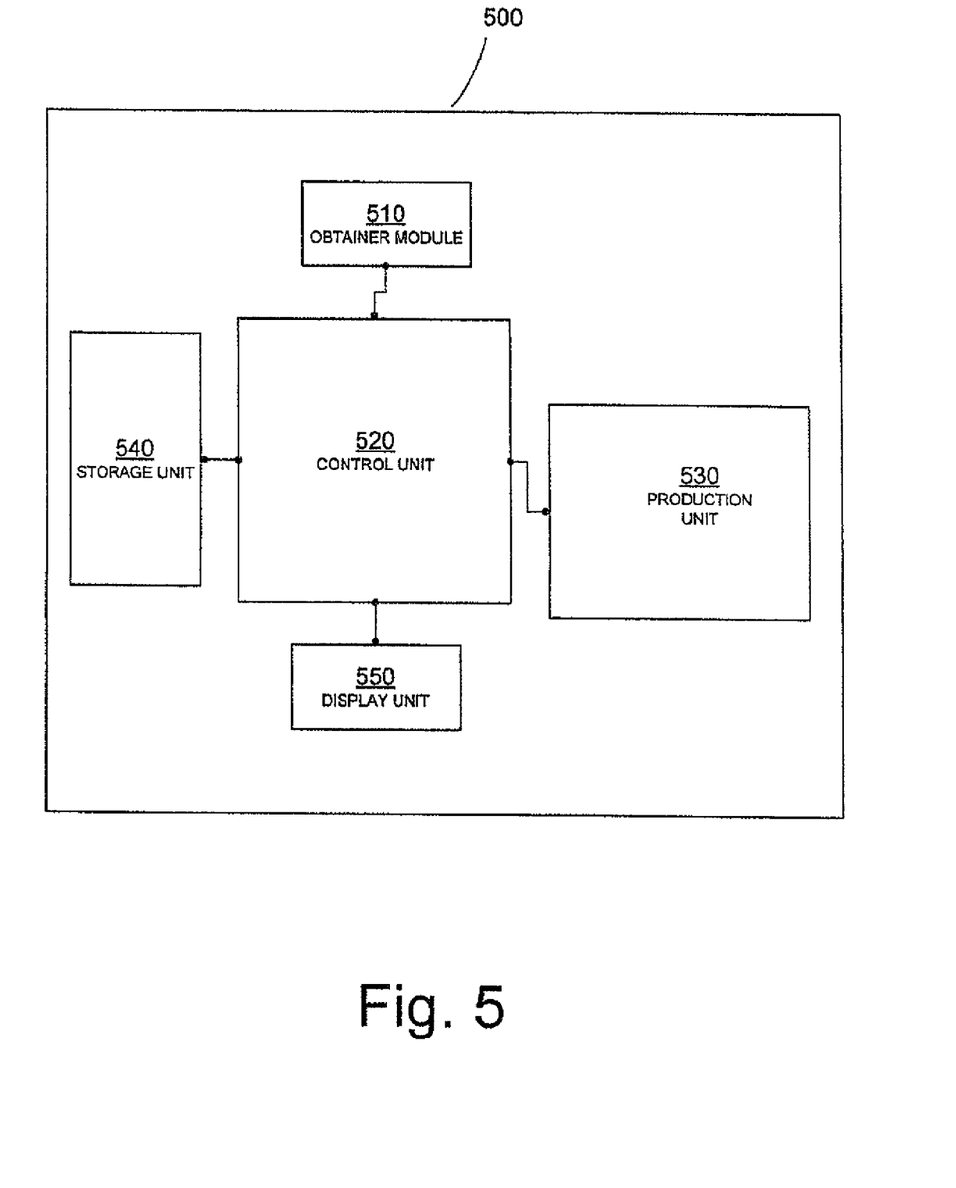
FIG. 5 illustrates a block diagram of the processing device according to an embodiment of the invention, particularly illustrating the interplay between components.

In the following, a block diagram of the processing device according to another embodiment of the invention is illustrated.

The processing device 500 of FIG. 5 comprises an obtainer module 510, a control unit 520, a production unit 530, a storage unit 540 and a display unit 550.

In detail, as described above, the obtainer module 510 may be realized by some kind of interface receiving structure data, e.g. CAD data, from an external source. The obtainer module 510 basically corresponds to the obtainer module 110, which has been previously described with respect to FIG. 1.

The control unit 520 may integrate the functions of the parts defining module 120, the meshing module 130 and the processing module 140 and may be realized by a microprocessor, or several microprocessors, computer or integrated circuit and is not limited to the above. For example, the control unit 520 may have a parallel processor running several software elements, for example, software elements corresponding to the functions of the modules.

The storage unit 540 may be any suitable or desirable storage device and may be one or a combination of several of the following components, a RAM, a ROM, a hard disk, an (E)EPROM, a disk, a flash memory, etc. A flash memory may be suitable to export or import code. The code may be a program including instructions adapted to cause data processing means in the control unit 520 to carry out operations of the method described above.

The production unit 530 is a unit to produce or manufacture a product. The production unit 530 may perform rapid prototyping, e.g. stereo lithography. For example, the production unit 530 produces the physical structure or a prototype of the physical structure according to structure data corresponding to the mesh model associated with desired physical properties. According to an example, the production unit 530 may be an apparatus for forming three-dimensional objects from a solidifiable liquid medium using, for example, high energy radiation, such as gamma rays, X-rays, ultraviolet radiation, visible radiation or electron beams. Lasers with coherent light radiation may be used to produce simply prototype in a solidifiable liquid medium.

Accordingly, after identification of results in the simulation, which do not provide the desired physical properties, fixes can be applied and the design can be modified. Afterwards the physical structure may be manufactured.

Therefore, the processing device 500 may first be used for computer-aided numerical simulation of the physical structure and then, once structure data of a physical structure is obtained, which has desired physical properties, i.e. the physical properties meeting the needed requirements for production and, e.g. incorporation in another part, the physical structure or a prototype thereof may be directly produced by the production unit 530.

Additionally, the processing device 500 comprises a display unit 550 which can display the mesh model, similarly to the illustration shown in FIG. 4B.

As described above, a processing module is adapted to process the mesh model using a Finite-Element-Analysis program for computer-aided numerical simulation of said physical structure. Since in the processing device 500, the processing module or simply its functions, is integrated or are performed, respectively, in the control unit 520, the Finite-Element-Analysis program may be stored in the storage unit 540 and may be ran using one or several processors of the control unit 520.

The Finite-Element-Analysis program may be an explicit code based on energy balance. Usually, explicit codes are applied for dynamic and static analysis and implicit for NVH analysis. Such applications include simulating crash events or high speed testing. However, in the present case, due to suitable preparation of the mesh model also static analysis may be performed. Furthermore, the usually large number of cycles and long time needed for analysis with an explicit code can also be shortened with the mesh model and assembly process described above.

The Finite-Element-Analysis program may perform a surface contact algorithm or an edge contact algorithm or a combination of the two. Preferably, at first a surface contact algorithm is used and then the edge contact algorithm.

The selection of the contact model and the contact condition, i.e. edge contacts versus surface to surface contacts etc. influences the runtime of the mesh model.

Further, element formulations that define how mesh elements behave, for example, in static, dynamic or NVH analysis, may be used. Conventionally, element formulation for durability and crash studies is straightforward but the same element formulation does not give accurate results for NVH studies. With an appropriate selection of the element formulation also accurate NVH study results may be obtained. Therefore, other parameters of the mesh model can remain the same.

Therefore, to further increase the accuracy of the results, the mesh model is adapted to take into account a fully integrated element formulation, a partially integrated element formulation or a combination thereof. For example, a fully integrated shell with assumed strain interpolants is used to alleviate locking and enhance in place bending behavior.

In the following, an example is described for static and dynamic load cases. Here, preferably an explicit solver is used and the element formulation selection is based on links for connections and fully integrated shell for shell elements.

A penalty based contact approach is selected as contact selection and a combination of a surface contact algorithm and an edge contact algorithm based on the parts and their interaction is used.

Further, controls, e.g. control cards, can be used including time step control, damping control, output frequency and termination controls, to control the input parameters of the model. Controls are features in the solver that allow controlling the analysis such that the event can be simulated closest to real life. Finally, validation may be performed by a "0" millisecond run.

The same mesh model, as described above, may be used for NVH analysis and modifying the static and dynamic load cases increases the accuracy of the results further. For example, the validated model from the static and dynamic load cases may be modified as follows.

The element formulation is changed to single point quadrature element instead of the fully integrated elements used above. Further, solver may be changed from explicit to implicit solver, which is usually a solver properly applied to static, quasi-static and dynamic problems with low frequency content, for example static and quasi-static structural design and analysis or metal forming. Then, contacts may be eliminated from the model and time step control may also be eliminated.

Figure 6:
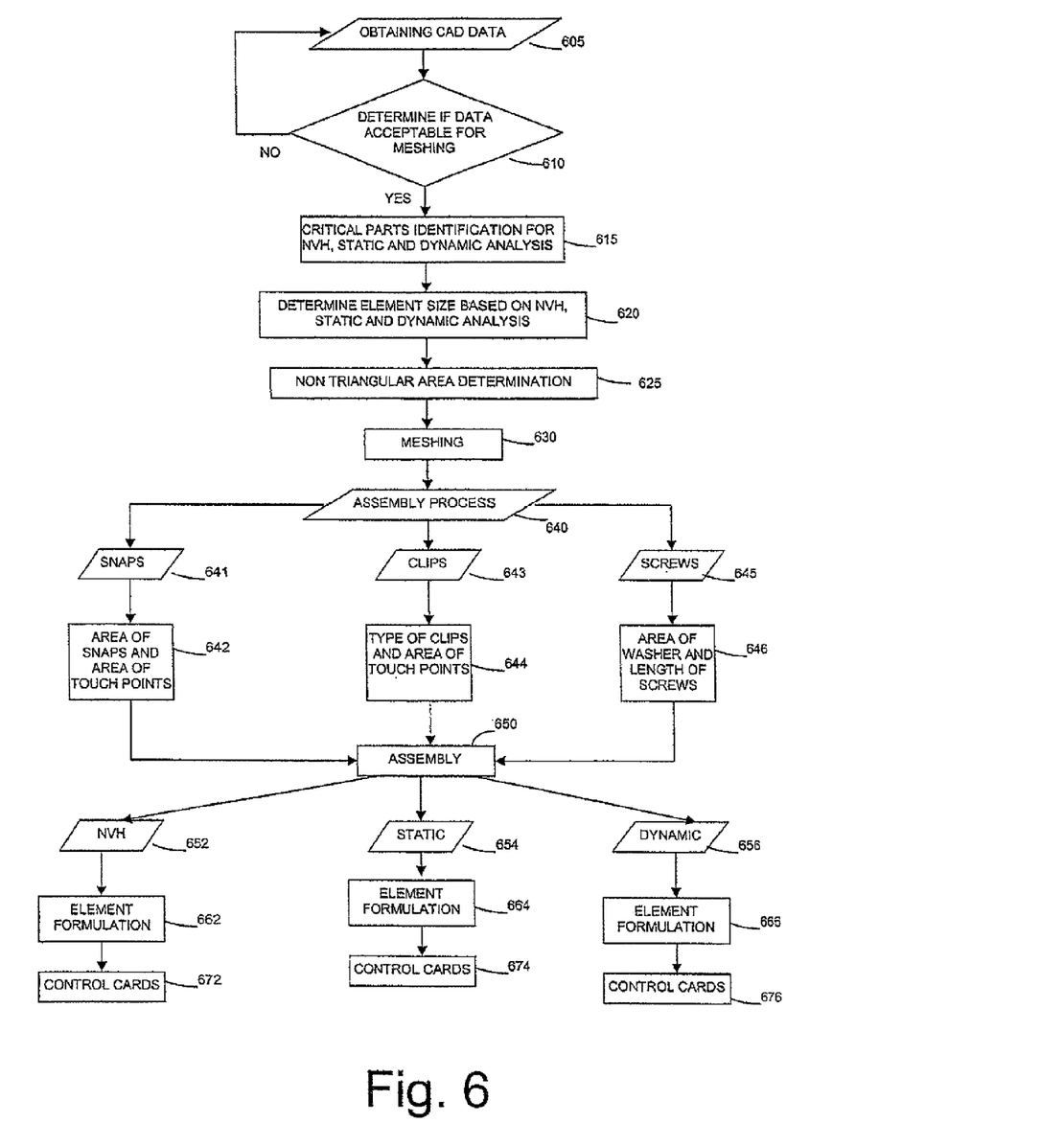
FIG. 6 illustrates a method for processing structure data according to another embodiment of the invention.

FIG. 6 illustrates a method for processing structure data according to another embodiment of the invention.

In particular, FIG. 6 shows a flowchart summarizing and connecting the previously discussed aspects in building a mesh model that may be used with all kinds of different analysis types.

In operation 605, CAD data is obtained. Then, it is determined if the data is acceptable for meshing in operation 610.

In detail, the determination may comprise creating a triangular mesh of the complete physical structure and determining physical penetration between components and assemblies so as to determine intersections which are non-physical.

In operation 615 critical parts for NVH, static and dynamic analysis may be identified. Further, in operation 620, the element size may be determined based on NVH, static and dynamic analysis. In operation 625, non triangular area determination is performed.

Subsequently, meshing is performed in operation 630, i.e. a mesh model approximating the physical structure is generated, as described above.

Then the process advances to operation 640, which is the above described assembly process, in which connections are distinguished, namely snaps in operation 641, clips in operation 643 and screws in operation 645.

If snaps are present, the area of the snaps and area of touch points are determined in operation 642. If clips are present, the type of clips and area of touch points are determined in operation 644. If screws are present, the area of washers used with a screw and length of the screw are determined in operation 646. After nodes of elements are selected to be linked to form links representing forces, the assembly is completed in operation 650.

In the following, minor adjustments can be made to the mesh model depending on the load case, namely NVH in operation 652, static in operation 654 and dynamic in operation 656. For example, as described above, the same element formulation may be used for static and dynamic load cases in operations 664 and 666 but for NVH it may be preferable to modify the element formulation, which may be done in operation 662.

Then in operation 672, 674 and 676 the controls may be set according to the individual needs. Finally, for static analysis, it may be advantageous to adjust loading techniques and contact selection for better accuracy, since an explicit solver is used.

Figure 7:
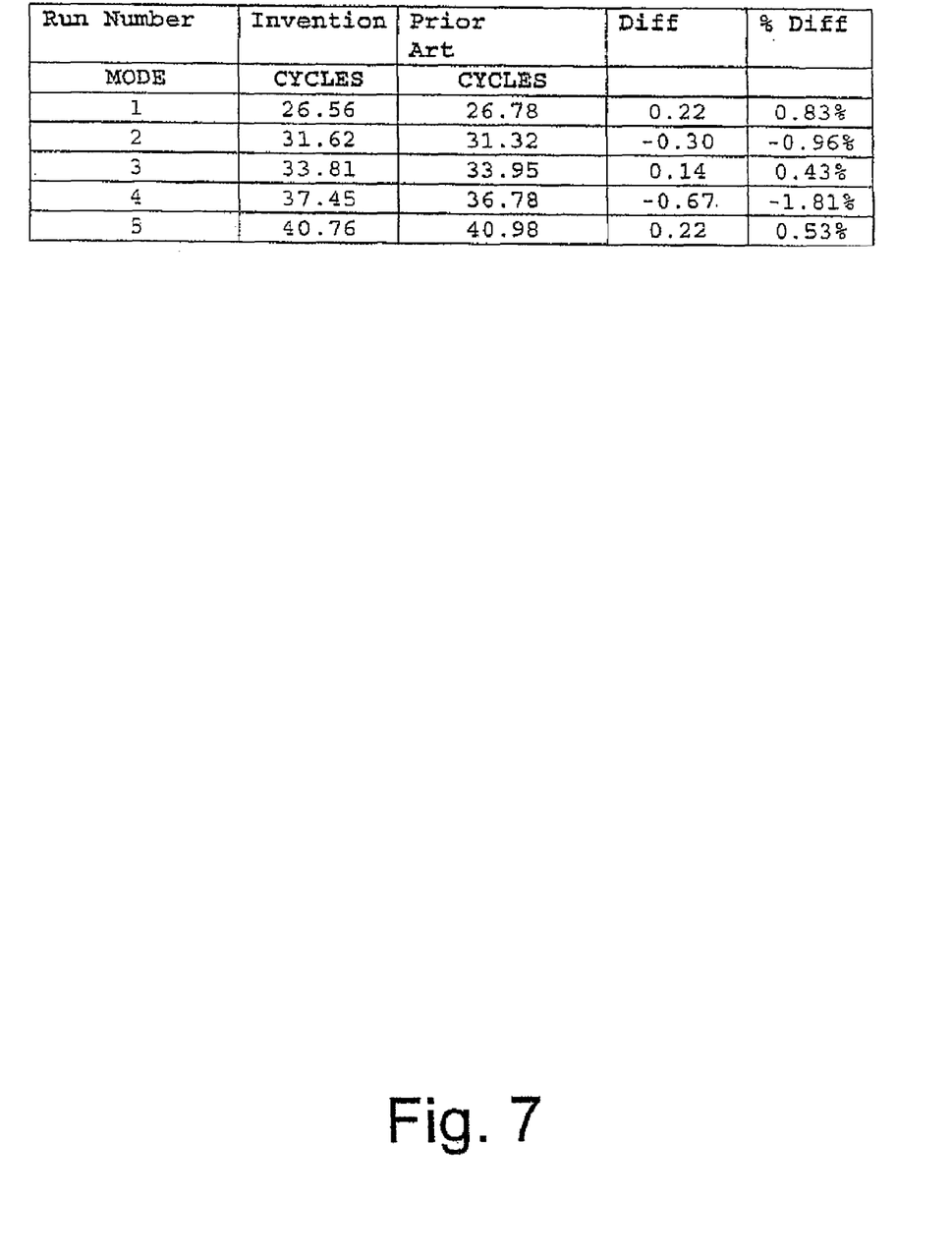
FIG. 7 illustrates a comparison between the results obtained according to the present invention and the prior art.

Then, the mesh model may be provided to the Finite-Element-Analysis program, such as LS-DYNA, which has been used in the experiment described in FIG. 7.

The results of such a computer-aided numerical simulation of the physical properties and behavior of a physical structure is shown in FIG. 7, which shows a comparison between the prior art and the invention.

These results were obtained with a specific element formulation. As can be seen, the cycles in column 2 have approximately the same values as the cycles in column 3. In detail, the values represent frequencies of different modes, namely modes of an NVH study. The values in the third column have been calculated with MSC-Nastran which is used conventionally for NVH analysis. Columns 4 and 5 show that the difference between the invention and the prior art is minimal.

This proves that by preparing the mesh model, as described above, before it is processed by a FEA program renders the mesh model basically independent on the FEA program or the type of analysis so that different analysis types may be performed with the same FEA program. Consequently, it is not necessary to produce several different mesh models for different studies and different programs while the quality and accuracy of the results are maintained and data management is simplified.

According to another embodiment, a program may be provided including instructions adapted to cause a data processor that may be included in the processing device 500 to carry out combinations of the above-described operations.

The program or elements thereof may be stored in a memory, such as a ROM or RAM or other suitable storage device, for example the storage unit 540, and retrieved by the processor for execution.

Moreover, a computer readable medium may be provided, in which the program is embodied. The computer readable medium may be tangible, such as a disk or other data carrier or may be constituted by signals suitable for electronic, optic or any other type of transmission. A computer program product may comprise the computer readable medium.

The above embodiments and examples of the invention may allow to perform computer-aided simulations for different purposes with basically one mesh model decreasing the time necessary to create different models, get familiar with different FEA programs and run different FEA programs with different settings.

It should be understood that the operations described herein are not inherently related to any particular device or module and may be implemented by any suitable combination of components. The devices, modules and units described in detail above constitute preferred embodiments to perform the operations of the described methods. However, this may not be limited to the same.

It will be apparent to those skilled in the art that various modifications and variations can be made in the devices, modules, units and methods of the invention as well as in the construction of this invention without departing from the scope of or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

What is claimed:

1. Processing device for structure data representing a physical structure, comprising:
    a non-transitory tangible computer readable medium comprising:
        an obtainer module for obtaining structure data representing a physical structure;
        a parts defining module for subdividing said structure data into at least two parts including a connection part and a material part;
        a meshing module for generating a mesh model approximating said physical structure by,
            identifying at least one part of said connection part and said material part for noise, vibration and harshness (NVH) analysis, static analysis, and dynamic analysis,
            determining mesh element sizes for said connection part and said material part based on said NVH analysis, said static analysis, and said dynamic analysis, and
            transforming said connection part and said material part into mesh elements having different sizes wherein there is an interface between mesh elements of the connection part and mesh elements of the material part, wherein a size of the mesh elements of the material part progressively increases moving away from the interface into the material part, and, wherein the mesh element sizes of said connection part are smaller than the mesh element sizes of said material part; and
        a processing module for processing said mesh model to estimate physical properties of said physical structure.
2. Processing device of claim 1, wherein said material part comprises at least one of a viscoelastic material part and an elastic plastic material part, said viscoelastic material part and said elastic plastic material part having different mesh element sizes.
3. Processing device of claim 1, wherein said connection part includes at least one of a screw, a clip, a snap and a base part of a screw, a clip, and a snap.
4. Processing device of claim 1, further comprising:
    an identifier module for identifying at least one of said connection part and material part in said structure data.
5. Processing device of claim 4, wherein said identifier module is adapted to identify at least one of a screw, a clip, a snap, a viscoelastic material part and an elastic plastic material part.
6. Processing device of claim 1, further comprising
    a link defining module for defining nodes of mesh elements and for linking selected nodes of selected mesh elements to form at least one link representing a force.
7. Processing device of claim 6, wherein the link defining module is used for determining an area of overlap between said connection part and another part, said area comprising touch point representing said nodes.
8. Processing device of claim 1, wherein the process module is used for processing said mesh model using a Finite-Element-Analysis-Program for computer-aided numerical simulation of said physical structure.
9. Processing device of claim 8, wherein the Finite-Element-Analysis-program is used for performing at least one of a surface contact algorithm And an edge contact algorithm and the mesh model is used for taking into account at least one of a fully integrated element formulation and a partially integrated element formulation.
10. Processing device of claim 8, wherein the Finite-Element-Analysis-program is an explicit code based on energy balance.
11. Processing device of claim 1, further comprising
    a production unit for producing the physical structure according to the structure data corresponding to the mesh model associated with desired physical properties.
12. The processing device of claim 1 wherein the meshing module determines if the structure data is acceptable for meshing.
13. The processing device of claim 1 wherein the meshing module determines a non-triangular area of the mesh model.
14. Processing method for structure data representing a physical structure, comprising:
    obtaining structure data representing a physical structure;
    subdividing said structure data into at least two parts including a connection part and a material part;
    generating a mesh model approximating said physical structure by,
        identifying at least one part of said connection part and said material part for noise, vibration and harshness (NVH) analysis, static analysis, and dynamic analysis,
        determining mesh element sizes for said connection part and said material part based on said NVH analysis, said static analysis, and said dynamic analysis, and
        transforming said connection part and said material part into mesh elements having different sizes wherein there is an interface between mesh elements of the connection part and mesh elements of the material part, wherein a size of the mesh elements of the material part progressively increases moving away from the interface into the material part, and, wherein the mesh element sizes of said connection part are smaller than the mesh element sizes of said material part; and
    processing said mesh model to estimate physical properties of said physical structure.
15. Processing method of claim 14, wherein said material part comprises at least one of a viscoelastic material part and an elastic plastic material part, said viscoelastic material part and said elastic plastic material part having different mesh element sizes.
16. Processing method of claim 14, wherein said connection part includes at least one of a screw, a clip, a snap and a base part of a screw, a clip and a snap.

17. Processing method of claim 14, further comprising:
identifying at least one of said connection part and material part in said structure data.

18. Processing method of claim 14, further comprising identifying at least one of a screw, a clip, a snap, a viscoelastic material part and an elastic plastic material part.

19. Processing method of claim 14, further comprising determining an area of overlap between said connection part and another part, said area comprising touch points representing nodes.

20. Processing method of claim 19, further comprising linking said nodes of selected mesh elements to form at least one link representing a force.

21. Processing method of claim 14, wherein a Finite-Element-Analysis-program is used for processing said mesh model for computer-aided numerical simulation of said physical structure.

22. Processing method of claim 21, further comprising performing at least one of a surface contact algorithm and an edge contact algorithm by the Finite-Element-Analysis-program and taking into account at least one of a fully integrated element formulation and a partially integrated element formulation in the mesh model.

23. Processing method of claim 21, wherein the Finite-Element-Analysis-program is an explicit code based on energy balance.

24. Processing method of claim 14, further comprising producing the physical structure according to the structure data corresponding to the mesh model associated with desired physical properties.

25. Processing method of claim 14 further comprising determining if the structure data is acceptable for meshing.

26. Processing method of claim 14 further comprising determining a non-triangular area of the mesh model.

27. A processor and memory is used for carrying out the method of claim 14.

28. A non-transitory tangible computer readable medium, in which a program is embodied, wherein the program includes instructions for executing the method of claim 14.

\* \* \* \* \*